United States Patent
Coon et al.

(10) Patent No.: US 7,134,001 B1
(45) Date of Patent: Nov. 7, 2006

(54) PIPELINE REPLAY SUPPORT FOR UNALIGNED MEMORY OPERATIONS

(75) Inventors: Brett Coon, Milpitas, CA (US);
Godfrey D'Souza, San Jose, CA (US);
Paul Serris, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 277 days.

(21) Appl. No.: 10/463,223

(22) Filed: Jun. 16, 2003

Related U.S. Application Data

(63) Continuation of application No. 09/420,748, filed on Oct. 20, 1999, now Pat. No. 6,728,865.

(51) Int. Cl.
*G06F 9/34* (2006.01)
(52) U.S. Cl. ............... 712/204; 712/24; 712/225; 711/201
(58) Field of Classification Search .......... 712/24, 712/23, 204, 218, 225, 241; 711/201
See application file for complete search history.

(56) References Cited

U.S. PATENT DOCUMENTS

| | | | | |
|---|---|---|---|---|
| 5,325,495 A | * | 6/1994 | McLellan | 712/219 |
| 5,778,423 A | * | 7/1998 | Sites et al. | 711/118 |
| 6,112,297 A | * | 8/2000 | Ray et al. | 712/225 |

* cited by examiner

*Primary Examiner*—William M. Treat

(57) ABSTRACT

Instructions asserted in a microprocessors instruction pipeline (3) are accompanied by control information, comprising a group of bits, asserted within a control information pipeline (5) that is synchronized to the instruction pipeline. At the execution stage, the control information is interpreted and appropriate action taken. The control information may indicate that the instruction has been reasserted (asserted again following an initial assertion) and may also indicate the number of times that the instruction has been consecutively asserted in the instruction pipeline. Applied to unaligned memory operations, in which a memory atom is asserted twice, the control information indicates which part of the unaligned data is to be fetched each time the atom is executed.

15 Claims, 2 Drawing Sheets

PIPELINE REPLAY SUPPORT FOR UNALIGNED MEMORY OPERATIONS

This is a continuation of application Ser. No. 09/420,748 filed on Oct. 20, 1999 now U.S. Pat. No. 6,728,865 which is hereby incorporated by reference to this specification.

REFERENCE TO RELATED APPLICATIONS

This application is related to my earlier filed applications Ser. No. 09/421,6115, entitled Pipeline Enable Bits and Ser. No. 09/421,972 entitled Pipeline Replay Support for Multi-Cycle Operations, filed of even date herewith, with which the present application is copending. Applicant claims the benefit of 35 USC 120 with respect to the foregoing applications.

FIELD OF THE INVENTION

The present invention relates to digital computers, and, more particularly, to a novel method and apparatus for reducing complexity of the logic circuits required to handle unaligned memory operations.

BACKGROUND

The operation of a digital computer is controlled by computer programs, such as operating systems and application programs. Those programs provide instructions to those functional units of a central processor in the digital computer responsible for handling and execution as binary information. Different binary sequences represent different instructions for a particular machine and the instructions tend to be unique to a particular processor or processor family. Thus, typically, different families of processors have different instruction sets, unless they are specifically designed to utilize an instruction set of another processor family.

The instructions of one processor typically cannot be understood directly by any of the other types of processors. The difference in instruction sets is often due to the format chosen by the designer for presenting instructions to the processor. In general, a designer may chose to design a processor for a complex instruction set computer (CISC) or reduced instruction set computer (RISC) or for a newer very long instruction set (VLIW) computer.

CISC processors provide special hardware for executing an entire operation. For example, an ADD instruction may provide one operand to an integer unit register, fetch a second operand from memory and place it in a second register, and combine the two operands in a third register. Because it does so, instruction formats are very complicated. Such structure takes a large amount of hardware and processing effort to tell one instruction from another. A RISC processor, on the other hand, is much simpler and treats each part of an ADD operation as a separate element. By providing consistently sized instructions, a RISC processor eliminates significant hardware and reduces the processing time needed to decode instructions.

A newer type of processor called a very long instruction word (VLIW) processor attempts to make use of the best attributes of both CISC and RISC. It uses consistent sized instructions (herein called "atoms") as do RISC processors, but groups a number of those instructions together in a VLIW word (herein called a "molecule") and provides processing units to execute the individual atoms in parallel.

The execution of most operations by a processor requires a number of steps. For example, instructions must be fetched from memory, sometimes a second instruction must be fetched from memory, the instruction is decoded and finally it is executed. This takes a number of operational cycles of the processor. In order to produce results as fast as possible, computers are designed so that each sequential instruction is begun (as far as is possible) on the next operation cycle after the preceding instruction has already begun the steps leading to its execution. This causes the steps leading to execution of subsequent instructions to overlap. In this manner, an instruction may often be executed each cycle.

The manner in which this starting and carrying out the steps leading to the execution of instructions so that an instruction executes each operation cycle is referred to by those skilled in the art as an instruction pipeline, which is included within processors. In operation to process an application program, the instructions of the application are serially entered into the pipeline by a pipeline control unit. The pipeline control unit includes a program counter, that loads instructions in a serial order into the pipeline. Via that pipeline, instructions are presented to a respective functional execution unit of the processor that is to execute the instruction.

Instructions do not always execute in the ideal order provided by the pipeline. Often things happen which interfere with the process. For example, a memory page at which an instruction resides may not be in main memory and must be paged in before the instruction can execute. Exceptions occur for a wide variety of reasons. When such exception occurs, further internal processing activity of the application program is temporarily halted, until that exception is resolved. The excepting functional unit issues a stop signal, herein called a "kill" signal, which pauses all other functional units in the microprocessor, until the exception is resolved, empties the pipeline of any instructions and immediately prompts an exception handler into action.

The exception handler fixes the problem which has arisen. An exception handler is a software routine conventionally designed to deal with such exceptions; and different exception handlers exist to handle each different kind of exceptions. A different routine is prepared to handle different exception. Thus, every computer contains a library of such software handlers in its associated memory. The pipeline control unit calls up an appropriate exception handler and executes that routine.

As an example, if a memory exception is due to the failure to locate data referenced by a load instruction within main memory, the exception handler is one that pages in that data and then returns back to the original excepted instruction. Processing of the application recommences with re-execution of the same instruction. However, this time the instruction is executed without generating that memory exception. In rare instances an exception handler of a RISC or CISC processors may emulate the instruction that caused the exception and then execute the emulated instruction to achieve the result desired. In other instances, an exception handler may only note that an exception occurred and return control to the excepted instruction or may decide to skip the excepted instruction and have execution resume at the next instruction. The exception handler thereafter returns control to the instruction pipeline controller by issuing a "return-from-exception" (RFE) signal. The latter signals the pipeline counter in the pipeline control unit to reissue and execute the instruction that was subject to the exception or, alternatively as called for by the exception handler, signals to advance the next instruction into the pipeline, that is, insert the memory address of the succeeding instruction into the pipeline, thereby moving pipeline activity beyond the instruction that generated the exception. In either event, the return-from-exception procedure is a very simple step.

Such a simple step of skipping past an excepted instruction is not possible for VLIW processors. In VLIW processors it is frequently desired for exception handlers to emulate an excepting atom instruction. Although re-execution of the excepting atom instruction is not desired, other atoms in the same molecule instruction must be executed. For example, one VLIW computer system is described U.S. Pat. No. 5,832,205 to Kelly et al, granted Nov. 3, 1998, entitled, Memory Controller For A Microprocessor For Detecting A Failure of Speculation On The Physical Nature of A Component Being Addressed (the '205 Kelly patent), assigned to Transmeta Corporation, assignee of the present invention, the content of which is incorporated by reference herein in its entirety. The present invention has particular application to VLIW computers, and, in particular, to VLIW computers described by the '205 Kelly patent, although it should be understood that the invention may be found to also be applicable to other types of computers.

The '205 Kelly patent discloses a novel microprocessor formed by a combination of a hardware processing portion, much simpler in structure than competitive prior state of the art microprocessors, and an emulating software portion, referred to therein as "code morphing software". Among other things, in the Kelly system the code morphing software carries out a significant portion of the functions of processors in software, thereby reducing the hardware required for processing and the greater electrical power that such hardware requires. For a better understanding of the foregoing and other functions accomplished by the code morphing software, the interested reader is invited to study the '205 Kelly patent.

A VLIW processor constructed in accordance with the '205 Kelly patent also contains an instruction pipeline. However, because a VLIW instruction ("molecule") is packed with a number of individual instructions ("atoms"), which are to be executed in parallel, what is generally referred to as the instruction pipeline in a processor prescribed in the '205 Kelly patent is actually a composite of multiple parallel pipelines. The stages of the instruction pipeline in the latter processor number, typically, five. Those stages comprise, as an example, first and second fetches (from memory), two register operations and, ultimately, the execution stage, at which an instruction is executed (or is found subject to an exception).

The pipeline formatting of a molecule rarely contains a single atom prescribing an operation, but, typically, comprises two and as many as four separate atoms prescribing different operations. Those atoms pass along the instruction pipeline as a collective group constituting the molecule. Since individual atoms are intended to be executed by separate functional execution units and such execution is intended to occur in parallel, i.e.,. simultaneously, the VLIW processor comprises multiple instruction pipelines, one for each functional unit in the computer that may be called upon during the processing steps to execute atom instructions. In making reference herein to the pipeline of a VLIW processor, it should be understood that reference is being made collectively to the multiple pipelines, unless the context of the statement indicates that reference is made only to a specific individual pipeline, as an example, to the memory pipeline, the ALU1 pipeline and so on.

At the respective pipeline execution stage, the atomic instructions are executed by separate non-conflicting functional units in the computer, ideally, concurrently for optimal speed of processing. If execution of one of those component instructions causes an exception, which, as a consequence, halts further processing and forces clearance of the instruction pipeline, as many as three atomic instructions in the VLIW molecule are also halted and cleared from their respective instruction pipelines.

In VLIW computers an exception handler cannot simply emulate the one atom responsible for the exception and advance the pipeline control unit instruction counter another step, as occurs in the prior CISC computers earlier described, since the remaining operation atoms in the same molecule also must be accounted for and require execution. Instead the VLIW computers exception handlers are required to either emulate all the atoms in the molecule before returning control back to the pipeline control unit or otherwise store, retrieve and execute those remaining atoms.

The foregoing exception handling process is very expensive in terms of VLIW processor time (clock cycles) and is likely to dramatically slow execution of the program. It also requires the software comprising the exception handlers to be significantly more complex than that for the CISC type processors. Neither result is attractive. Both detract from inherent advantage of the VLIW processor.

In my copending application entitled PIPELINE ENABLE BITS, Ser. No. 09/421,615 filed of even date herewith, the content of which is incorporated by reference in its entirety, I disclose an improvement, applicable to a VLIW computer and possibly to other computers as well, through which control information, a group of bits, therein referred to as enable bits, is linked to the molecule, and each of those bits pertains to a respective one of the individual atom instructions within a molecule. Those bits help processing by indicating whether the associated atom is to be executed or not when the instruction is present at the execution stage of the pipeline. The execution units interpret those bits and execute the instruction (or not) accordingly.

As the molecule progresses through the processors instruction pipeline, stage by stage, that control information also progresses along what is therein referred to as a control information pipeline, also containing multiple stages, in synchronism with the progress of the molecule through the instruction pipeline. At the execution stage, both the control information and the individual atoms of the molecule are presented in parallel to respective execution units for those atoms. Each execution unit checks the information pipeline for information pertinent to the respective atom presented for execution, prior to any execution.

In a specific embodiment described in that application, the VLIW computer referred to therein contained four functional units responsible for execution of atoms. One enable bit is included for each of those four execution units and the four bits in parallel defines the information packet.

By default all enable bits are set ("1") when the molecule is first introduced to the instruction pipeline. When the atoms in the molecule are presented again for execution, the respective functional unit first checks to ensure the one (of the four) enable bits relevant to the functional unit (pertaining to the respective atom) is set. If disabled ("0"), the functional unit does not execute the respective atom. If set, the functional unit executes the atom. Alternatively, the execution unit determines that the atom is subject to an exception, in which case an exception is taken. That action is communicated to the pipeline control unit. With an exception, the functional unit issues a "global kill" signal to clear the instruction pipeline of all atoms awaiting execution, including the atom responsible for the exception, and to pauses all other operations.

Responding to an exception, the pipeline control unit saves the VLIW instruction address (which, as later herein described, permits the instruction to later be reasserted in the pipeline) and also saves the accompanying packet of enable bits, placing those bits within a register, therein called the error register, and selects and calls up exception handler software.

The exception handler handles the exception and then issues a return-from-exception to the pipeline control unit. Prior to issuing the return-from-exception to the pipeline control unit, the handler (if required for by its design) also writes to the aforementioned error register and disables the enable bit associated with the atom responsible for the exception.

Upon the return-from-exception, the pipeline control unit reasserts the same VLIW instruction (address) in the instruction pipeline together with the packet of enable bits. The pipeline control unit retrieves that packet from the error register, where temporarily stored, and transfers that data into the respective control information pipeline. Since the enable bit associated with the atom that was responsible for the exception is now disabled ("0"), that atom cannot be executed when the molecule again reaches the pipeline execution stage. The remaining atoms in the molecule for which the associated enable bits remain set ("1") are able to be executed (or, when checked, may also be found subject to an exception, in which case the procedure is repeated for such atom).

If for a particular type of exception, the exception handler resolves the exception without necessitating disablement of the atom that produced the exception, when the molecule is reasserted in the instruction pipeline, as above described, that atom now executes, since the exception handler already resolved the condition that initially caused the exception.

The foregoing procedure avoids the slower processing speed as would be occasioned by the use of more complex software for the exception handlers as required those handlers to handle or otherwise account for the remaining atoms in the molecule and permit them to be presented for execution to their respective functional units. Generally speaking, based principally on hardware, the control information pipeline provides a fast and efficient means to permit reassertion of a VLIW molecule in the instruction pipeline, while permitting software, the exception handler, to control whether individual atoms within a molecule are executed by the respective functional unit.

In addition to exceptions, other out-of-the ordinary actions, similar in effect to exceptions, are found to occur from time to time in the execution of instructions that also may slow down the speed of processing. One of those actions is an unaligned memory operation. The present invention deals with those events in a new way that also makes use of a synchronized control information pipeline.

The memory unit controls access to the memory where various digital information, such as instructions and data, is stored for potential use during processing. Typically, any piece of digital information, such as data, is stored in a self-contained unit of memory, that is, a certain string or number of adjacent memory cells all in a "segment" or "row" of memory (a precisely defined multi-byte wide region aligned to a boundary, as an example, a four-byte aligned block of memory). When a load instruction requires the memory unit to retrieve the digital information at a certain address in memory, the memory unit retrieves that digital information in a single operation. Since the information is self-contained within a defined segment off memory, the information is referred to as "aligned". The memory unit need only access the specified row of memory, and read the specified number of bits containing the desired information.

In some instances, the digital information sought is not aligned, but bridges more than the single continuous segment of memory, a condition referred to as "unaligned data". Companion references to the latter condition sometimes refer to the condition as unaligned memory and to the instruction as an unaligned instruction, despite such references being literally incorrect Retrieval of unaligned data from memory requires the memory unit to access memory twice, obtaining each part separately. Such an operation can be handled by adding complex hardware to the memory unit. As an example, in addition to the pipeline control unit maintaining state information on the pipeline, each execution unit would be required to also maintain that state. Not only does the foregoing increase complexity, but it increases the chance for errors to occur.

The present invention takes advantage of and adapts the foregoing control information pipeline hardware and software technique that links one or more bits (sometimes referred to as "help bits") to atom instructions to mark, annotate or, as otherwise termed, tag, as necessary, atom instructions with control information that allows more efficient handling of an unaligned memory operation, thereby further enhancing the efficiency of processing operations.

As an advantage the invention permits VLIW computers, such as those constructed in accordance with the '205 Kelly patent, to gain in performance without increasing the complexity of the hardware or software. As a further advantage, the invention permits continued reassertion of a VLIW instruction (molecule) containing an unaligned atom without re-executing other atoms in the molecule.

Accordingly, an object of the invention is to improve the internal operating efficiency of a microprocessor, more particularly, a VLIW microprocessor.

A further object of the invention is to provide a new more efficient process and apparatus internal to a VLIW microprocessor for handling those atoms in a molecule (VLIW instruction) that require obtaining data from an unaligned memory location.

SUMMARY OF THE INVENTION

In accordance with the invention, a processor includes an instruction pipeline, a control information pipeline and a pipeline control unit that operates the instruction pipeline and the control information pipeline in synchronism. The pipeline control unit originates a packet of help bits, and contains the means for appropriately marking and introducing the help bits in the control information pipeline when an instruction is asserted, whereby both the instruction and help bits progress through the respective pipeline stages in synchronism. At the execution stage of the pipeline, respective execution units interpret those help bits, and function in accordance with that interpretation.

Further in accordance with the invention, the help bits signify an unaligned memory operation, specifically, the first or second part of the unaligned memory location.

As an advantage, a processor may be modified to include multiple control information pipelines to serve separate and distinct control operations. As an example, the foregoing control information pipeline may be combined in a single processor with the "enable bit" control information pipeline described in my copending application.

The foregoing and additional objects and advantages of the invention together with the structure characteristic thereof, which was only briefly summarized in the foregoing passages, becomes more apparent to those skilled in the art upon reading the detailed description of a preferred embodiment of the invention, which follows in this specification, taken together with the illustration thereof presented in the accompanying drawings.

DETAILED DESCRIPTION OF THE PREFERRED EMBODIMENT

Figure 1:
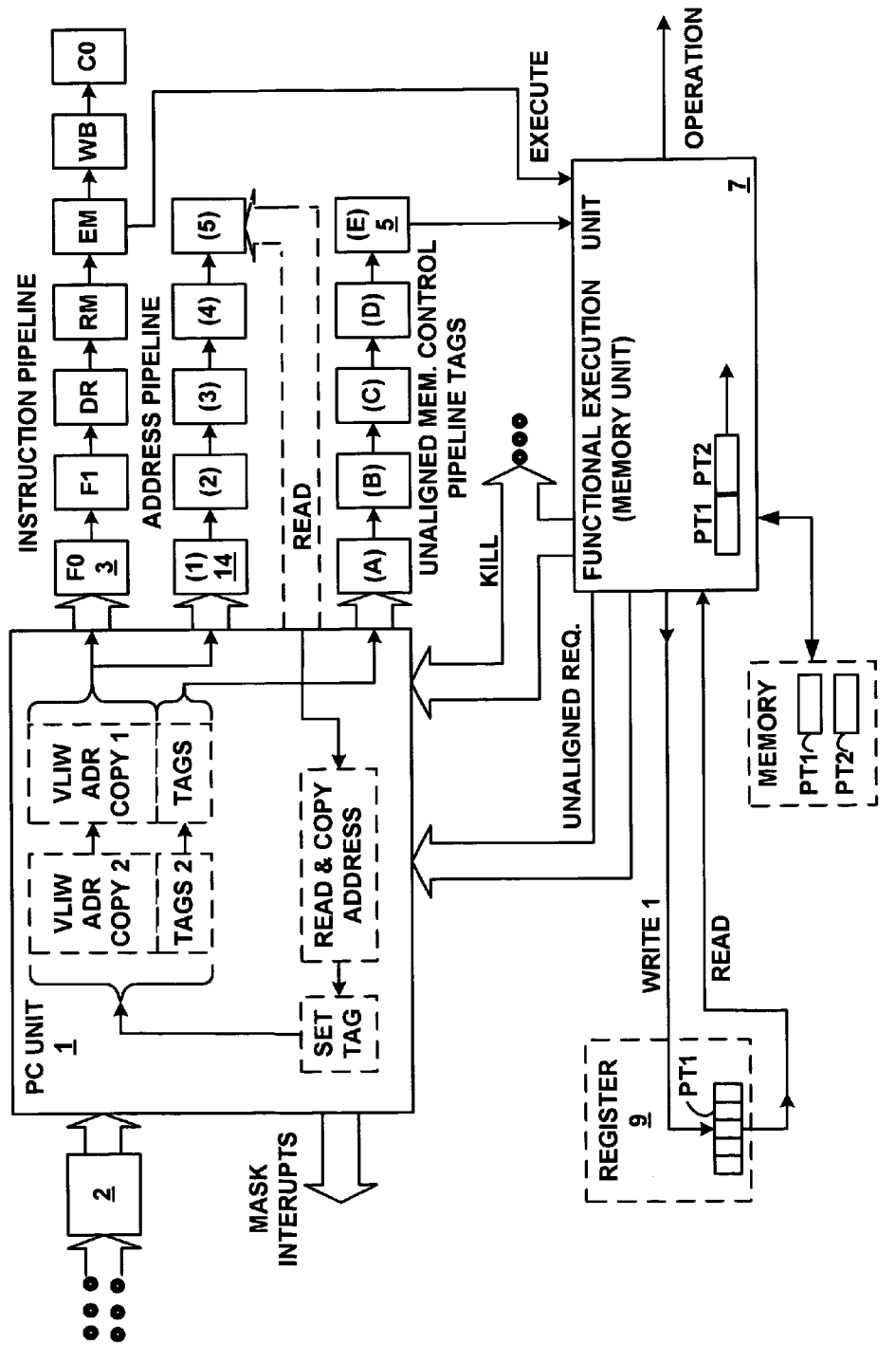
FIG. 1 illustrates an embodiment of the invention for handling unaligned memory operations.

Reference is made to FIG. 1 which is a simplified functional block diagram of an embodiment of the invention to handle unaligned memory operations. The figure is a partial illustration of the microprocessor of a VLIW computer, presenting only the internal elements of a processor material to assertion and execution of instructions. Those elements include the pipeline control (PC) unit 1, the VLIW instruction pipeline 3, an address pipeline 14 and the memory unit 7, the latter being the only one of the various functional execution units of the processor to make use of the unaligned memory information.

The processor also includes a register 9 and a sideband or pipeline 5, sometimes referred to herein as the unaligned memory control information pipeline. The latter pipeline may be constructed of a multi-bit multi-stage shift register, a known device not illustrated in detail. Pipeline 5 carries the tags or help bits. That pipeline is controlled by pipeline control unit 1, as herein more fully described. In practice all pipelines are found within the pipeline control unit, and are illustrated as separate from that unit to aid understanding of the invention.

Unaligned memory control information pipeline 5 and register 9 should be recognized as being new to VLIW processors, and is a distinguishing hardware feature to the invention. As becomes apparent hereafter, the implementation of the invention also requires minor hardware modification to the memory unit 7, and minor software modifications to accomplish the functions as hereinafter more fully described.

Instruction pipeline 3 contains five principal stages, designated F0, F1, DR, RM, and EM. Stage F0 represents the first part of the fetch process in which the instruction is fetched from a memory, not illustrated, using the instruction (memory) address introduced into the pipeline; stage F1 is the second part of the fetch for that instruction; DR represents a decode stage (or, for a different type of atom, a register read); RM represents the register read stage (or, for a different type of atom, a cache 0 stage); and EM represents either the execution stage or a cache 1 stage, a floating point execute, or a media execute stage.

Two additional stages designated WB, write-back and CO, commit, are optional, but are desirable operations, such as described, as an example, in the particular VLIW processing system described in the '205 Kelly patent. The later two optional stages are sometimes combined into a single stage of the pipeline. Though briefly noted, the function of those optional stages is not relevant to the invention.

The instruction pipeline depicted is actually a composite of the several different instruction pipelines in the processor, each associated with a different execution unit. Each operation such as add, load, branch, shift is specified by an atom, which has a format that resembles a typical RISC instruction; and multiple atoms are packed in a molecule. The individual pipelines permit the multiple independent operations (atoms) contained in a molecule to execute in parallel.

In a practical embodiment of a VLIW computer, the VLIW molecule may comprise either sixty-four bits or 128 bits in length, and may contain between one to four atoms defining separate operations. By design, one of the atoms may be reserved for a memory operation, while the other atoms in the molecule may be an ALU0, ALU1 and an immediate operation; and any of the other operations available in the processor may be substituted for the ALU1 integer operation within a molecule. Each of the operations in the molecule should require service by a separate mutually exclusive functional unit of the processor. The atoms within a molecule of necessity must be such as to execute in different functional units, so as to avoid a conflict that shuts down the processor. The instruction format to which the computer programmer must adhere, ensures that atoms in a molecule use distinct functional units.

When an instruction (molecule) containing four independent atoms is entered into the instruction pipeline (as an address), the atoms, being directed to different functional units within the processor, are routed into the appropriate pipeline associated with the respective functional unit. Those separate atoms progress along the respective pipelines, step by step, essentially in tandem. Typically, the initial two fetch steps are common to all the atoms, hence, the several different pipelines employ the same two stages and diverge to the various functional units following the second stage. The respective functional units perform instruction execution at the fifth stage.

Address pipeline 14, constructed of a multi-stage multi-bit series of registers, is included within PC unit 1. This pipeline contains five stages (1) through (5), paralleling (and mimicking the progression of) the F0 through EM stages of instruction pipeline 3. The address pipeline carries the VLIW instruction address, step by step, down the pipeline in synchronism with the advancement of the VLIW instruction retrieved into the instruction pipeline 3. That movement or transfer of digital address information from one stage to another is controlled by the processors PC unit 1.

The address pipeline provides protection against loss of the instruction (molecule). The instruction is initially fetched from the address asserted in the pipeline in the initial pipeline stages. If for any reason an exception (or other out-of-the ordinary event) occurs in the instruction pipeline that results in the loss of the instruction, the PC unit 1 is able to retrieve the instruction address from the address pipeline and simply retrieve the lost instruction at that address in memory for subsequent reassertion. The address pipeline provides a convenient location to access the address instruction required in the operation of the present invention.

Unaligned memory control information pipeline 5 contains five stages (A) through (E), which, like the address pipeline 14, parallel the F0 through EM stages of instruction pipeline 3. Pipeline 5 is also controlled by pipeline control unit 1. The pipeline transfers the help bits, the electronic tags asserted therein, to succeeding pipeline stages, stage by stage, transferring the bits down the pipeline, mimicking the movement of the molecule along the instruction and address pipelines.

In the preferred embodiment, two separate bits may be used to tag an unaligned memory atom and, hence, unaligned memory control information pipeline 5 should be at least two bits wide. One bit may be used to indicate the first part of the unaligned data should be fetched and the other bit used to indicate the fetch of the second part of that data. The pipeline control unit asserts these help bits in parallel into unaligned memory control information pipeline 5.

By default, in this embodiment when both bits are disabled (a "0, 0") normal memory operation is signified. If the memory unit is required to fetch the first portion of the unaligned data, the first bit (in right to left order) is set and the second bit is disabled ("0, 1"). If the memory unit operation is to fetch the second portion of the unaligned data, the second bit is set and the first bit is disabled ("1, 0"). The foregoing is one example. In other embodiments three bits may be used to communicate the same information. In still other embodiments other forms of coding may be substituted.

Memory unit 7 controls access to memory, not illustrated, in which the various digital information, such as addresses and data, is stored. Typically, any piece of digital information is stored in a self-contained unit of memory, a predetermined number of adjacent memory cells aligned in a row or continuous segment of memory, holding the aligned data. When a "load" atom requires the memory unit to retrieve the digital information at a specified address, the memory unit retrieves that digital information in a single operation.

In some instances, however, the digital information being sought is unaligned, bridging more than the single row or segment of memory. Retrieval of data from unaligned memory requires the memory control unit to access memory twice, each time retrieving a part of the unaligned data. It may be noted that in computers constructed under the '205 Kelly patent, by one design, molecules, are either 8 or 16 bytes in length and are always aligned to an 8-byte boundary, and, hence, by definition are never unaligned. Thus only data can be unaligned in that computer, and is the same treatment given here.

Memory unit 7 recognizes when a load request is made for unaligned data. By checking the least significant bits (LSB) of the address and "knowing" the organization of the memory, the memory unit is able to determine if the data is aligned or unaligned. As an example when byte addresses are used, if the address spans an 8-byte boundary, then the lower three bits of the address (bits 2, 1 and 0) are inspected. If the length of the memory access is at least two bytes, and the address starts at the last byte of one row of memory (i.e.,. The lower 3-bits of the address is (1,1,1), then the data is unaligned. The memory unit determines the length of the access (which is given in the is instruction) and adds that to the lower 3-bits of the address. If the result is determined to be greater than eight, (i.e.,. 1000 binary), the memory access is unaligned.

When a memory atom is presented at the execution stage EM of the pipeline for execution by memory unit 7, the memory unit determines whether the instruction is subject to an exception and determines whether the access required is to aligned or unaligned memory. This is accomplished in the short interval of time (about one-half clock cycle) during the execution stage, in which, prior to execution, the functional units, including the memory unit, make ready for execution, an interval referred to as the first part of the EM stage.

Each execution unit, including the memory unit, is able to generate an exception, an interrupt and a global kill signal; and each is also able to issue a stall signal, but only after issuing a kill signal. The kill signal directs all functional units to discard all instructions within the second half of the respective execution stage, and flushes the pipeline. It should be realized that each functional execution unit acts independently, and are coordinated by the pipeline control unit. Thus, individual execution units do not know whether or not any of the other execution units are generating exceptions. Moreover, more than one execution unit is able to assert a global kill signal simultaneously. The stall signal pauses the pipelines, stalling processing. When a request to unaligned memory is recognized by memory unit 7, and assuming that the instruction was not determined by the memory unit to be subject to an exception (and that no other functional execution units generated an exception to their respective atoms) the memory unit responds by issuing a global kill signal to all other functional units in the processor including the pipeline control unit 1. It also issues a stall signal. As a result all instructions (molecules) in instruction pipeline 3 are discarded and all functional units discard any pending atom instructions so the operations cannot complete. On receiving the Kill signal, pipeline control unit 1 reads the instruction address from stage 5 of address pipeline 14, storing that address in a temporary memory, not illustrated. Memory unit 7 also sends a signal, herein referred to as an unaligned memory alert, to pipeline control unit 1. With that input the pipeline control unit recognizes occurrence of an unaligned memory operation.

If, however, the instruction is found subject to an exception or produces an interrupt or if any other execution unit of the processor contains an instruction that is found subject to an exception or produces an interrupt, the handling of any such exception or interrupt takes precedence over the unaligned memory operation. As becomes apparent, if one part of the unaligned memory operation were completed, and an exception or interrupt were taken prior to completion of the other part of that operation, the processor state would be inconsistent in the exception or interrupt handler, resulting in an unrecoverable processor error. Thus, it is important that the memory operation be incapable of being split, so as to appear "atomic" to software. Accordingly, any such exception or interrupt is handled by the pipeline control unit of the processor employing the appropriate exception and/or interrupt handlers, such as was earlier herein described and as described in the '205 Kelly patent and later patents and applications improving thereon, the details of which are not necessary to the understanding of the present invention.

Assuming that no exception or interrupt occurred or that if an exception or interrupt did occur, such was resolved, the description of operation of the invention continues. Responding to the memory alert, the pipeline control unit thereupon issues a priority "interrupt masked", which prevents interrupt handlers, a software routine used by the processor, from being entered when an unaligned operation has been partly completed. Since any exceptions, if occurring, would have earlier been resolved, but interrupts can occur at any time (are asynchronous). Hence, it is important to mask against potential interrupts to prevent such from conflicting with completion of the unaligned memory operation. And the pipeline control unit reasserts the instruction address into the instruction pipeline 3 (and into the address pipeline) twice in consecutive order.

Each time the instruction is asserted it is accompanied an assertion of a packet of help bits containing the control information associated with the load atom. For the first reassertion of the instruction (address), pipeline control unit 1 sets the help bits to "0,1" to indicate that the memory atom "load-from-memory" operation is to load the first part of the unaligned data from the first location of memory, and asserts those help bits in the unaligned memory control information pipeline 5, concurrently with assertion of the instruction address into the instruction pipeline 3.

It is recognized that the reasserted molecule contains other atoms that typically should not be executed when the molecule is first reasserted and, hence, are disabled. The details for disabling the other atoms at this juncture is addressed later in this description of operation.

On the second reassertion of the instruction, the pipeline control unit sets the help bits to "1,0" to indicate that the pertinent atom load-from-memory operation is to load the second part of the unaligned data from the second location in memory, and asserts those help bits in control information pipeline 5, concurrently with reassertion of the molecule into the instruction pipeline. Both the molecule (address) initially reasserted, the molecule address, and help bits progress along the respective pipelines. When the molecule again reaches the execution stage (EM) a second time, the memory atom is present at memory unit 7 for execution, the help bits, linked with that atom appear at the fifth stage of the unaligned control information pipeline 5. It should be noted that on the second re-issue of the unaligned memory atom, the other atoms in the molecule are enabled for execution, as later herein discussed in greater detail.

Among other actions, not relevant to the present invention and not described, as may be taken by memory unit 7, the memory unit checks the help bits and determines whether the memory atom presented for execution is an unaligned memory operation and requires a load of the first part of the unaligned data. If so, the memory unit fetches the first part of the unaligned data and stores that data in a location in register 9.

When the same molecule and the memory atom are presented a second time at the execution stage (EM) of instruction pipeline 3, the second packet of help bits, earlier described, linked to the second reassertion of the molecule, is present at the fifth stage (E) of the unaligned memory control pipeline 5. In the same manner as previously described, the memory unit determines that the memory atom is an unaligned memory operation and that the second part of the unaligned data is to be fetched.

The memory unit then retrieves (loads) the second part of the unaligned data and fetches the first part of the data from register 9 to merge them together to complete the required block of parallel bits, the data called for by the load atom and writes the data into a register, not illustrated, of the processor for subsequent use in processing. The foregoing completes the unaligned memory operation.

The processor then continues its regular operation, including execution of the remaining atoms in the molecule, which have been enabled, the latter preferably using the "enable bit" technique later herein discussed.

The foregoing description of operation was simplified slightly to permit the operation to be understood more quickly, putting aside the additional complexity due to the multiple memories contained within or ancillary to the processor. The foregoing description made reference only to loading data from a memory, without specifically identifying any particular type. For completeness, that subject is next addressed.

As well known, all processors contain or have access to several types of memory, including long term memory, random access memory (RAM) and cache. As also recognized, the cache is the smallest memory in size and is the fastest to access. When a memory unit first fetches digital information the unit first looks for that information in cache. If not present in cache, the memory unit retrieves that information from main memory and places that information cache so that the processor may access that same digital information more quickly should it be needed again, and then retrieves the data therefrom for use.

As is the conventional practice, particular "valid" bits are associated with each copy of the data, so that, when the data is changed at one memory location during operation, the processor is able to ensure that the other copies of that data are updated. This procedure ensures that the data available for processing remains valid. The particular details of those operations and design are available in the technical literature and need not be described in detail.

When any instruction requires a load from memory, memory execution unit 7, first checks the cache to determine if the addressed data is present (and valid). If not present (or valid), the memory unit signals a "cache miss". In the event of a cache miss, the memory unit issues a "global kill" signal, earlier described, to all units, issues a "stall request" to the PC unit, which then stalls the instruction pipeline, accesses memory, such as RAM, or, if not found in RAM, then accesses long term memory to retrieve the data and place it in cache. Once placed in cache the memory unit ends the "stall request" and the pipeline control unit restarts the instruction pipeline (and in this invention the additional pipelines as well).

The foregoing is recognized as the same procedure found in most "pipelined" processors, including the type X86 processor systems. In terms of clock cycles, the foregoing procedure to load the cache is expensive. However, that initial investment of time is repaid many times over, as those skilled in the computer art understand, due to the substantially greater speed with which data is retrieved from cache memory.

On the first reassertion of the unaligned atom instruction, the first part of the data will not be found in cache. The memory unit thus retrieves the unaligned part of the data, installs it in cache, where the part remains as unaligned, and performs the operation using the data from the cache. When on the next reassertion of the unaligned atom instruction, the same procedure occurs to obtain the second part of the unaligned data. The next time the same instruction occurs in the course of a computer application, the required unaligned data should be found in the cache. Alternatively, the computer may be programmed to "know" when data is being retrieved for the first time and avoid the cache look up step.

As the skilled reader appreciates, for one reason or another it is entirely possible to locate only one part of the data in cache. In that event, the foregoing cache-miss procedure is followed to retrieve and cache the part not currently in the cache. While issuing the unaligned memory atom in two parts may relatively double the cost to obtain the data and slightly lower speed of processing, that cost is minor compared to the benefit obtained with the invention by having only the pipeline control unit maintain the pipeline state.

The foregoing embodiment of the invention was described in connection with a memory operation without regard to whether the memory being accessed was capable of being cached, that is, permitted to be placed in cache, or not. As is known, some portions of memory are not permitted to be placed in the cache, referred to as uncached memory, such as regions of the memory address space that typically represent input-output devices (disk drive interfaces and video graphics). As those skilled in the art appreciate, the unaligned memory operation of the invention functions with respect to both cached and uncached memory.

Discussion of the other atoms that accompanied the foregoing unaligned memory atom was earlier deferred and is next addressed. Since the preferred embodiment of the invention is intended for application as part of a VLIW computer, such as that disclosed in the cited '205 Kelly patent and improvements thereof, it should be recognized that the foregoing unaligned memory operation occurs in a single one of multiple atom instructions normally contained within a molecule instruction. To ensure that other functional units are not adversely affected by the double instruction reissue, all atom instructions, except the load/store atom should be disabled on the first part of the unaligned memory atom reissue.

In the improved version of the Kelly et al computer system described in the '205 Kelly patent, which has been modified to incorporate the pipeline enable bit invention described in my co-pending application Ser. No. 09/421, 615, entitled PIPELINE ENABLE BITS, earlier cited, atom disablement is accomplished by changing the state of the enable bits for those other instructions to disable. When the atoms are so marked disable, the disable mark in the enable bit is recognized by the execution stage of the pipeline. Hence, those other atom instructions are not executed, the first time the unaligned instruction is reissued. However, on the second reissue, those enable bits are reset to enable. Hence the other atoms are executed only once during the two passes of the "unaligned" instruction through the instruction pipeline.

For the first reissue of an unaligned memory atom, the enable bits associated with atoms for the arithmetic and logic (ALU) units are forced to "0" (disabled). Branch or commit atoms do not contain linked enable bits. The commit atom is permitted to execute twice since there is no adverse effect. Branches are dealt with entirely separately. A third possibility is to disable all but the memory atom.

On the second reissue of the molecule, all of the enable bits may be set "1", so that all atoms may execute. Alternatively, the enable bits may be stored in the error register (EPC) following an exception, as earlier herein described, caused by an atom other than the memory atom (and the resolution of that exception), or likewise by a different exception caused by the memory atom, other than for unaligned data, then the pipeline control unit will instead retrieve and use those stored enable bits on the second reassertion of the unaligned memory molecule. The other atoms of the molecule will execute or not in accordance with the setting of those enable bits. The foregoing error register and storage of enable bits is described at length in my copending application, earlier cited, which is not here repeated.

The foregoing description described the operation of the invention in connection with a load operation. As those skilled in the art appreciate from an understanding of the invention, the invention is not limited to load operations. The described unaligned memory operation is also adapted to use with store operations.

Basically unaligned stores are handled in the same manner as described for loads, except that intermediate register 9 is not needed and is not used in the operation. When the memory unit detects that a store (atom) is to an unaligned address, the memory unit asserts the "kill" signal to flush the instruction pipeline, and sends the unaligned memory alert signal to the processor control unit to indicate the memory operation is unaligned. The PC unit does not know whether the unaligned memory operation is a load or a store, and cannot distinguish between the two operations. If the store is cached, much of the description presented for the load operation is applicable to the store operation. Specifically, the unaligned store is split into two operations, each of which involves a cache look-up, earlier described. If the addressed data is not currently in the cache, a memory read is performed and the addressed data is placed in cache. Then the store completes by writing the data into the cache.

Uncached stores are like uncached loads in the sense that the cache is not checked. Instead, both parts of the store are performed directly to memory.

The foregoing was described separately from the invention described in my copending application for patent earlier cited. As those skilled in the art will realize from reading the foregoing description, the present invention may be combined (as the applicant intends) together in a single VLIW microprocessor to realize the benefit of both such inventions.

As earlier described, the invention is preferably employed with the "enable bit" invention of my copending patent application, and the latter uses an enable bit control information pipeline constructed of essentially the same types of electronic circuits that are used for control information pipeline 5. Should additional controls be desired for other types of atoms, additional control information pipelines may be added to the processor, along with the additional modifications to some execution units of the processor and the logic of the pipeline control circuit. The foregoing is generally illustrated in FIG. 2 to which reference is made.

Figure 2:
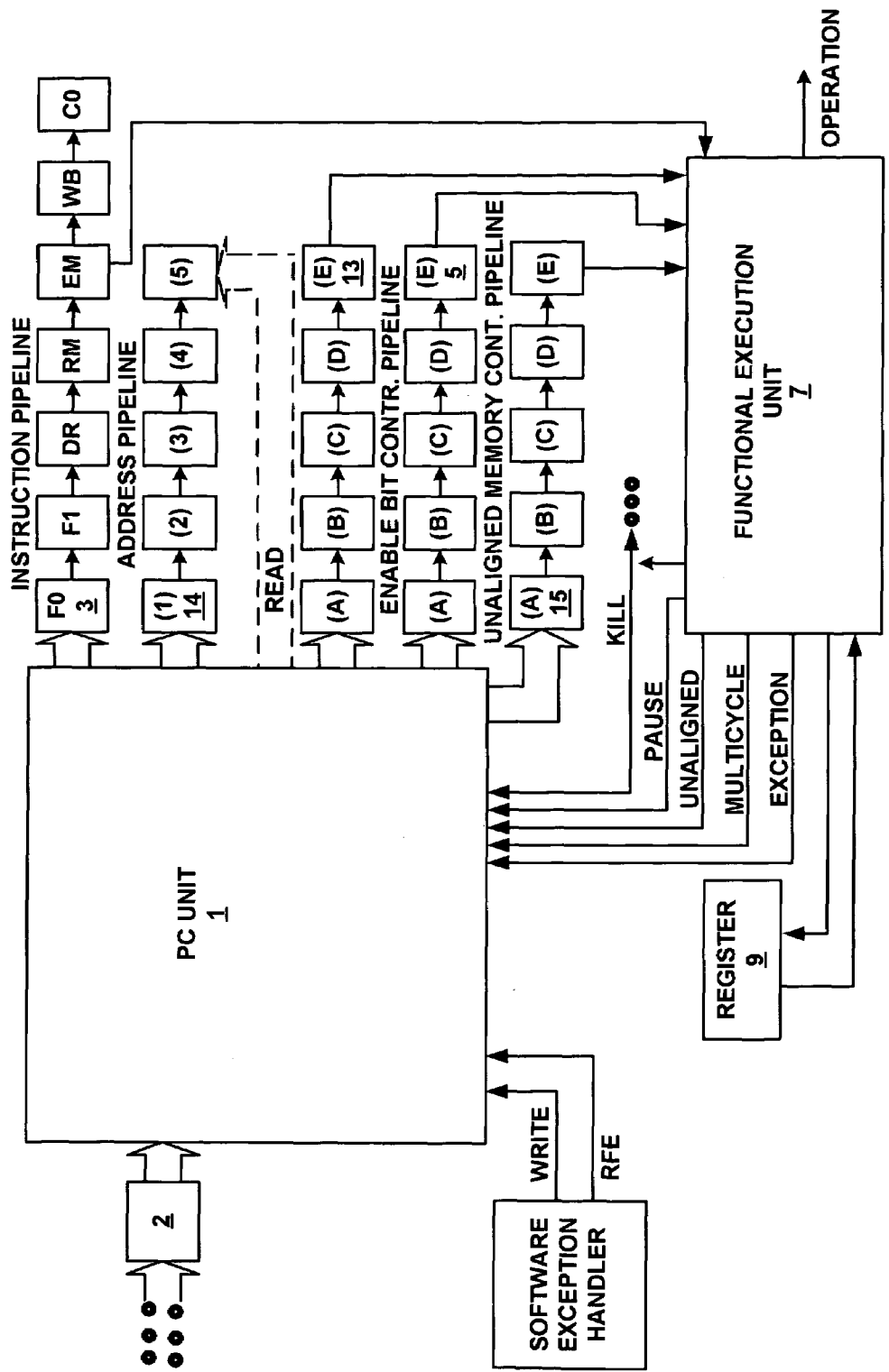
FIG. 2 illustrates another embodiment of the invention as part of a processor that also contains the improvements described in my copending application.

FIG. 2 illustrates in a functional block form the pertinent parts of a microprocessor in which the control information pipeline of FIG. 1 and an "enable bit" control information pipeline 13 are included together in the processor. For convenience the same numbers that were used to identify the elements as they appeared in FIG. 1 are used to identify those elements in this figure. However, for this figure functional execution unit 7, is representative of the group of execution units contained in the microprocessor, and that group includes the memory unit used in FIG. 1. Other elements and signals not illustrated in FIG. 1 are described in my copending applications, and do not require additional description, since the figure is intended only to illustrate inclusion of additional control information pipelines in a single microprocessor. In addition to the individual control information pipelines for the enable bits and for the unaligned memory bits, the processor may be expanded to include additional individual control information pipelines 15 and the controls for that pipeline.

As those skilled in the art recognize from an understanding of the invention, the unique means (and manner) described for handling an unaligned memory operation by double assertion of the instruction, places all the control information in one place within the pipeline control unit. Individual functional units are not required to maintain state, except for the memory unit which holds the result of the first part of the unaligned memory access in register 9, and state information is not spread out between multiple functional units. The described structure offers an easier and more safe method of processing unaligned data.

The control information sideband or pipeline for the unaligned memory "help" bits was described as being physically separate from the instruction pipeline. However, as recognized from an understanding of the invention, physical separation in hardware is not required to practice the invention. It should be realized that the foregoing sideband may be integrated within the instruction pipeline to define a new or expanded instruction pipeline, which is equivalent in all respects to the separate pipelines described in the illustrated embodiment. An instruction pipeline contains a series of registers that are used to hold instruction information at each stage of the pipeline; and that information is transferred from one register to a succeeding register. By employing larger registers, if available, in that instruction pipeline, large enough to accommodate, as an example, the additional help bits, those help bits can be placed within and moved along the pipeline in synchronism with the instruction just as when separate hardware is used. It should thus be understood that the invention does not require separate hardware for the individual pipelines.

A particular aspect of terminology should be clarified to possibly assist those less skilled in the art in interpreting the foregoing specification and the claims which follow. When a person skilled in the computer art states that the processor control unit asserts an instruction in the instruction pipeline, what is actually placed in that pipeline is the address of the desired instruction into the pipeline. The first and second stages of the pipeline, the fetch stages, use that address to fetch the instruction from the specified address in memory and apply the instruction to the succeeding stages of the pipeline, which ultimately leads to the pipeline execution stage at which the instruction is executed. In that context, a statement that a processor unit is asserting an instruction into the pipeline is synonymous with placing the instruction address into the instruction pipeline. The meaning is similar when employed in describing a VLIW processor, in which a plurality of individual instructions, called atom instructions or atoms, are grouped together into a molecule, which are asserted in parallel in the VLIW pipeline. Those atom instructions are, ideally, executed in parallel by respective execution units. Thus, when it is said that a molecule (or an instruction) is asserted in the pipeline, what is actually asserted is the address of that molecule. In the fetch stages of the pipeline the molecule, the collection of individual instructions packed together, is retrieved at the specified address for advancement in the pipeline to the execution stage.

Further, one recognizes that some portions of the foregoing detailed description was presented in terms of symbolic representations of operations on data bits within a computer. Those descriptions and representations are the means used by those skilled in the data processing arts to most effectively convey the substance of their work to others skilled in the art. The operations are those requiring physical manipulations of physical quantities. Usually, though not necessarily, those quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and were merely convenient labels applied to these quantities.

Additionally, the manipulations performed were often referred to in terms, such as interpreting, determining, reading and writing, which are commonly associated with mental operations and actions performed by a human. No such capability of a human operator is intended or desirable in any of the operations that were described herein, which form part of the present invention. The operations are machine operations. Useful machines for performing the operations of the present invention include general purpose digital VLIW computers or other similar devices. In all cases the distinction between the method operations in operating a computer and the method of computation itself should be borne in mind. As those skilled in the art recognize the present invention related to a method and apparatus for operating a computer in processing electrical or other (e.g. mechanical, chemical) physical signals to generate other desired physical signals.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A method of computer processing for handling unaligned memory operations comprising:
   fetching a first unaligned data segment from memory;
   storing said first unaligned data segment in a register;
   fetching a second unaligned data segment from memory;
   retrieving said first unaligned data segment from said register; and
   merging said first unaligned data segment and said second unaligned data segment in accordance with control data corresponding to said first unaligned data segment and said second unaligned data segment, wherein said instruction is one of a plurality of atom instructions comprising a molecule instruction, and wherein any atom instructions of said molecule instruction not relating to said unaligned memory operation are disabled until said merging is performed.

2. The method of claim 1, wherein said fetching is performed in response to an instruction asserted in an instruction pipeline.

3. The method of claim 2, wherein said instruction pipeline is flushed before said instruction is asserted.

4. The method of claim 3, wherein the operation of said instruction pipeline is halted before said flushing is performed.

5. The method of claim 1, wherein said disabling is performed by changing the state of enable bits.

6. The method of claim 1, wherein said control data is asserted into a control information pipeline.

7. The method of claim 1, wherein said control data comprises a plurality of help bits.

8. A computer processor for handling unaligned memory operations comprising:
   a register for storing unaligned data segments fetched from memory;
   an instruction pipeline for conveying asserted instructions;
   a control information pipeline for conveying control data;
   a pipeline control unit for asserting said instructions to said instruction pipeline, and for asserting said control data to said control information pipeline; and
   a functional execution unit for fetching a first unaligned data segments from memory in response to one or more of said asserted instructions, for causing said first unaligned data segments to be stored in said register, for fetching a second unaligned data segments from memory in response to one or more of said asserted instructions, for retrieving said first unaligned data segments from said register, and for merging said first unaligned data segments and said second unaligned data segments in accordance with control data corresponding to said first unaligned data segments and said second unaligned data segments, wherein said instruction pipeline is flushed before conveying said asserted instructions.

9. The processor of claim 8, wherein the operation of said instruction pipeline is halted before said flushing is performed.

10. The processor of claim 8, wherein said asserted instructions are one or more of a plurality of atom instructions comprising a molecule instruction.

11. The processor of claim 10, wherein any atom instructions of said molecule instruction not relating to said unaligned memory operation are disabled until said merging is performed, and wherein said disabling is performed by changing the state of one or more enable bits.

12. The processor of claim 8, wherein said control data is asserted into a control information pipeline.

13. The processor of claim 8, wherein said control data comprises a plurality of help bits.

14. A computer system for handling unaligned memory operations comprising:
- a memory for storing computer-readable code; and
- a central processing unit coupled to said memory comprising:
    - a register for storing unaligned data segments fetched from said memory;
    - an instruction pipeline for conveying asserted instructions;
    - a control information pipeline for conveying control data;
    - a pipeline control unit for asserting said instructions to said instruction pipeline, and for asserting said control data to said control information pipeline; and
    - a functional execution unit for fetching a first unaligned data segments from said memory in response to one or more of said asserted instructions, for causing said first unaligned data segments to be stored in said register, for fetching a second unaligned data segments from said memory in response to one or more of said asserted instructions, for retrieving said first unaligned data segments from said register, and for merging said first unaligned data segments and said second unaligned data segments in accordance with control data corresponding to said first unaligned data segments and said second unaligned data segments, wherein said asserted instructions are one or more of a plurality of atom instructions comprising a molecule instruction, wherein any atom instructions of said molecule instruction not relating to said unaligned memory operation are disabled until said merging is performed, and wherein said disabling is performed by changing the state of one or more enable bits.

15. The computer system of claim 14, wherein said control data comprises a plurality of help bits.

* * * * *